No. 744,423. PATENTED NOV. 17, 1903.
A. P. STECKEL.
ELECTRICAL CLUTCH AND BRAKE MECHANISM.
APPLICATION FILED JUNE 3, 1903.
NO MODEL. 2 SHEETS—SHEET 1.

No. 744,423. PATENTED NOV. 17, 1903.
A. P. STECKEL.
ELECTRICAL CLUTCH AND BRAKE MECHANISM.
APPLICATION FILED JUNE 3, 1903.
NO MODEL. 2 SHEETS—SHEET 2.

No. 744,423.                                                                 Patented November 17, 1903.

UNITED STATES PATENT OFFICE.

ABRAM P. STECKEL, OF BUFFALO, NEW YORK.

ELECTRICAL CLUTCH AND BRAKE MECHANISM.

SPECIFICATION forming part of Letters Patent No. 744,423, dated November 17, 1903.

Application filed June 3, 1903. Serial No. 159,879. (No model.)

*To all whom it may concern:*

Be it known that I, ABRAM P. STECKEL, a citizen of the United States, residing at Buffalo, in the county of Erie and State of New York, have invented new and useful Improvements in Electrical Clutch and Brake Mechanisms, of which the following is a specification.

This invention relates to an electrical clutch and brake mechanism which is intended for starting, stopping, and reversing an element driven from a drive-shaft or element which rotates constantly in one direction. The mechanism is more particularly intended for operating the reciprocating beds or tables of rolling-mills, planers, and similar machines, but is also useful in other connections.

One object of the invention is to provide a mechanism of the character described whereby the driven element can be rapidly started, stopped, and reversed without shock or injury to any of the parts of the apparatus.

Another object of the invention is to provide the clutches and brake with controlling means which renders it impossible to reverse the driven element except after the brake has been applied to retard the movement of the driven element.

Another object of the invention is to provide a powerful electrical clutch or brake of simple and practical construction.

Figure 1:
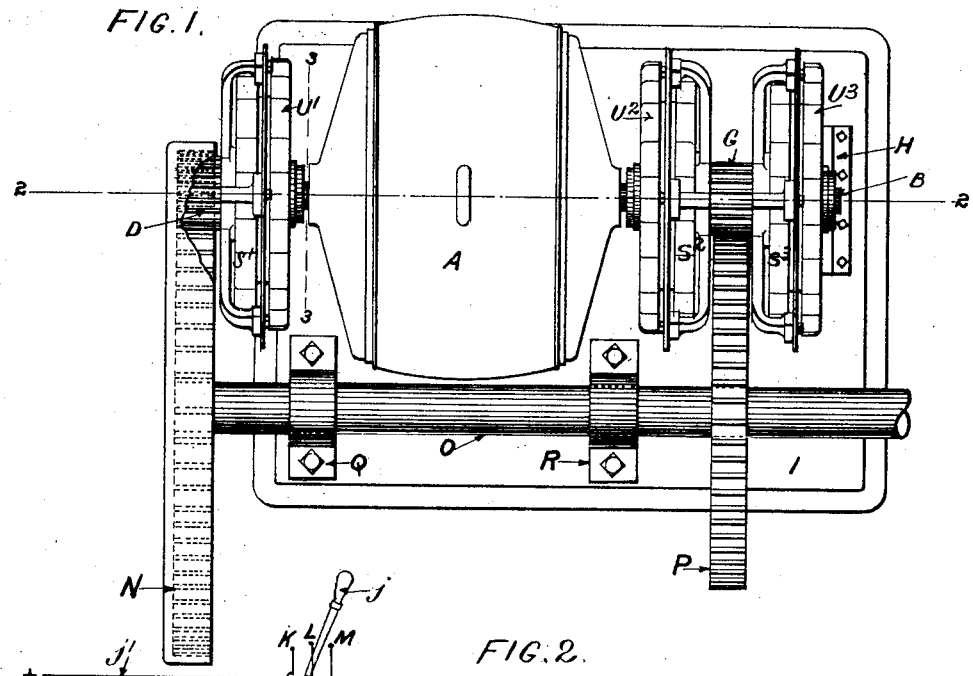
Figure 2:
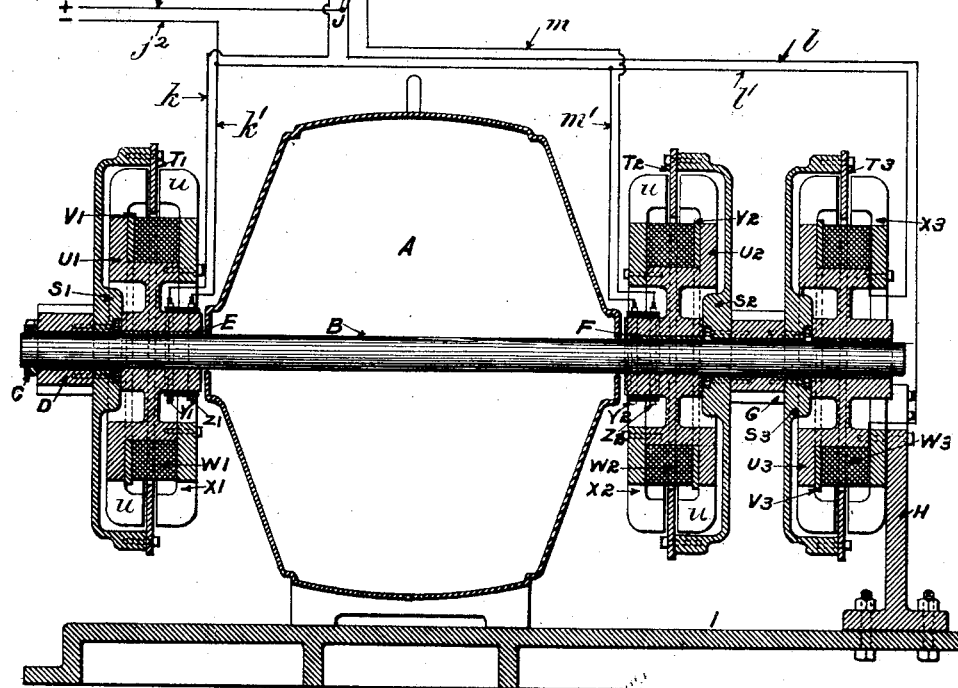
Figure 3:
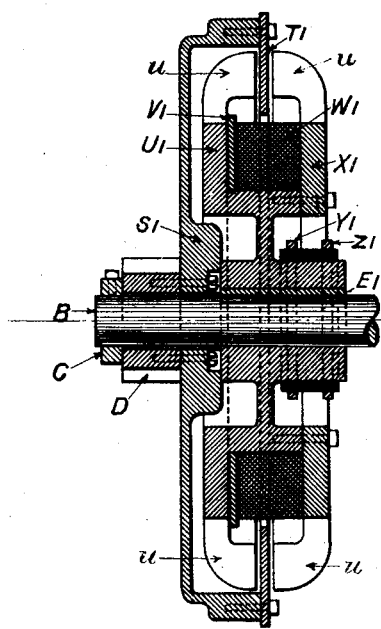
Figure 4:
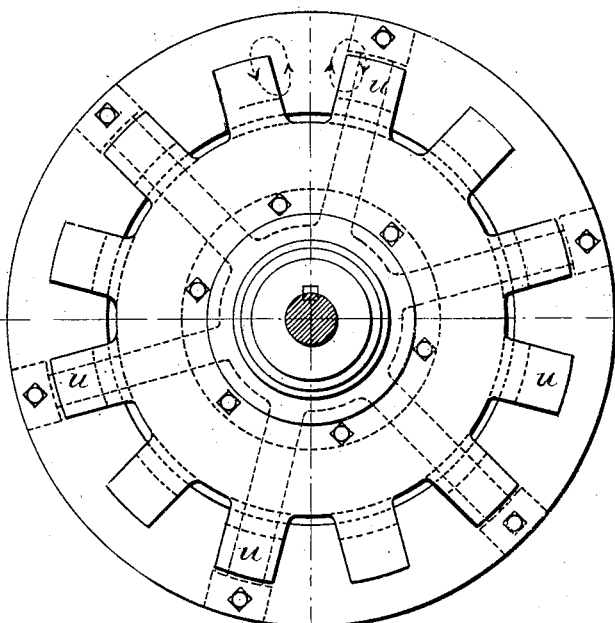

In the accompanying drawings, consisting of two sheets, Figure 1 is a plan view of an electrical clutch and brake mechanism embodying the invention. Fig. 2 is a longitudinal sectional elevation thereof, on an enlarged scale, in line 2 2, Fig. 1, and showing diagrammatically the clutch and brake controlling means. Fig. 3 is a sectional elevation, on an enlarged scale, of one of the clutches. Fig. 4 is a section through the drive-shaft, showing the clutch in elevation.

Like letters of reference refer to like parts in the several figures.

B represents a drive-shaft which is supported in suitable bearings and rotated continuously in one direction by a prime mover, and O is a shaft which is adapted to be driven in either direction from the drive-shaft. In the construction shown the drive-shaft is journaled in suitable bearings in a casing A, which is supported on a bed I and incloses the driving-motor (not shown) for the drive-shaft, and the driven shaft is journaled in suitable bearings Q R on the bed I. The drive-shaft is provided with two electrical induction-clutches consisting of members $S'$ $S^2$, which are loose upon the shaft, and members $U'$ $U^2$, which are fixed to the shaft to rotate therewith by keys E F, or otherwise. The loose clutch members are caused to rotate with the fixed clutch members when the clutches are energized by the passage of an electric current through the same. The loose clutch members are operatively connected to the driven shaft by suitable gearing, so that when the loose member $S'$ is coupled to the drive-shaft the driven shaft is rotated in one direction, and when the other loose clutch member $S^2$ is coupled to the drive-shaft the driven shaft is rotated in the opposite direction. In the construction shown the loose clutch members are respectively provided with or secured to gear-pinions D G, which respectively mesh with an internal gear-wheel N and a gear-wheel P, secured to the driven shaft.

$S^3$ $U^3$ represent the two members of an electrical induction-brake, the member $S^3$ of which is loosely mounted on the drive-shaft B to rotate relative thereto and is fixed to the gear-pinion G, while the other member $U^3$ is fixed to a suitable stationary support or standard H and preferably constitutes a bearing for the drive-shaft B.

The two clutches and the brake are alike, and each is constructed as follows, (see particularly Figs. 3 and 4:) The member $U'$ of the clutch, which is fixed to the drive-shaft, is in the form of an iron spool having end flanges between which is located a coil or winding $W'$, of insulated wire. One flange $X'$ is preferably detachably secured to the body of the spool to facilitate the winding of the coil upon the same. The two flanges of the spool are provided with outwardly-projecting radial portions or pole-pieces $u$, the outer ends of which extend toward each other and are separated by an intervening air-space. The terminals of the winding $W'$ are connected to insulated collector-rings $Y'$ $Z'$ on the hub of the fixed member $U'$. The member $S'$ of the clutch consists, preferably, of a spider or hub and spokes, to the outer portion of which is secured a metal ring T'. This ring is located in the space between the inwardly-projecting outer ends of the pole-pieces and is arranged in a plane perpendicular to the axis of the clutch. When the clutch is energized or magnetized by the passage of an electric current through its coil, any relative motion between the ring T' and the magnetic pole-pieces sets up currents in the ring in the direction indicated by the arrows in Fig. 4, and the reaction of these currents on the magnetic pole-pieces produces a force which tends to resist any relative motion between the ring and pole-pieces or to hold the two parts of the clutch relatively fixed, thus in the case of the clutches causing the loose members to rotate with the shaft and fixed members and in the case of the brake to arrest or stop the rotation of the movable member. The ring T' is preferably made of copper on account of its high conductivity, also for the reason that, conducting as it does alternating currents, it has less self-induction than does a ring or disk containing iron, and as self-induction tends to demagnetize the clutch its action is stronger when the copper ring is employed. With the ring T' of the movable clutch member located in a plane perpendicular to its axis of rotation its expansion under the influence of heat and contraction have little or no appreciable effect in increasing or decreasing the air-gap between the ring or disk and the pole-pieces. The action of the clutch is therefore more even and reliable. The radial pole-pieces of the clutch when rotating act as fan-blades, and as the air is not confined at the outer ends of the pole-pieces and spokes of the loose clutch member the pole-pieces cause strong currents of air to pass outwardly across the opposite faces of the ring or disk, thereby keeping the latter, as well as the winding of the clutch, cool. These results are not attainable in a construction where one clutch member has a cylindrical shell surrounding or inclosing the other member. In the described construction, furthermore, the loose member of the clutch is light, thereby lessening its momentum and inertia and enabling a much quicker starting and stopping thereof and of the part driven thereby.

The clutches and brake are provided with electrical controlling means, whereby either of the clutches or the brake can be thrown into and out of action separately, and the controlling means is preferably so arranged that the brake is energized and brought into action to retard the driven shaft after either clutch is deënergized and before the other clutch can be brought into action to reverse the driven shaft. The controlling means shown in the drawings for this purpose is as follows: $j$ represents a switch-lever, which is connected to the wire $j'$ of an electric circuit $j'$ $j^2$. K, L, and M represent three contact-pieces against which the switch-lever is adapted to be moved and which are respectively connected by wires $k$, $l$, and $m$ with one terminal of the windings of the two clutches and brake. The other wire $j^2$ of the electric circuit is connected by branch wires $k'$, $l'$, and $m'$, respectively, with the other terminals of the windings of said clutches and brake. The branch wires leading to the clutches are provided with suitable brushes contacting with the collector-rings Y' Z' Y² Z², carried by the fixed members U' U² of the clutches. When the switch-lever is in engagement with the contact K, the current passes from the wire $j'$ through the switch-lever, contact K, and wire $k$, winding W' of the clutch S', U', and wire $k'$ back to the wire $j^2$. The clutch S' U' is thus energized and the driven shaft rotated in one direction. When the lever is moved into engagement with the contact L, the current passes from wire $j'$ through said lever, the wire $l$, winding W³ of the brake, and wire $l'$ back to the main-circuit wire $j^2$, thus energizing the brake and retarding the movement of the driven shaft. When the lever is moved into engagement with the contact M, the current passes from wire $j'$ through said switch-lever, wire $m$, winding W² of the clutch S² U², and wire $m'$ back to the main-circuit wire $j^2$, thereby energizing said clutch and rotating the driven shaft in the opposite direction. The contact L for the brake is arranged between the contacts K M for the two clutches, so that the switch-lever is necessarily engaged with said contact L in moving the same in either direction from one clutch-contact to the other. The rotation of the driven shaft cannot therefore be reversed until after the brake is brought into action and the shaft retarded.

I claim as my invention—

1. The combination of a driving element, two electrical clutches having members connected to rotate with said driving element, and coöperating loose members, a driven element, drive connections between one of said loose clutch members and said driven element to move the latter in one direction, drive connections between said other loose clutch member and said driven element to move the latter in the opposite direction, an electrical brake having a fixed member and a member connected to said driven element, and controlling means which operates to alternately energize a clutch and the brake, substantially as set forth.

2. The combination of a drive-shaft, two electrical clutches having members fixed to rotate with said shaft, and coöperating members loose on said shaft, a driven shaft, gearing connecting one of said loose clutch members and said driven shaft to rotate the latter in one direction, gearing connecting the other loose clutch member and said driven shaft to rotate the latter in the opposite direction, an electrical brake having a fixed member and a member loose on said drive-shaft and connected to one of said loose clutch members, and controlling means which operates to alternately energize a clutch and the brake, substantially as set forth.

3. The combination of a drive-shaft, two electrical clutches having members fixed to rotate with said shaft, and coöperating members loose on said shaft, pinions loose on said shaft and connected to said loose clutch members, a driven shaft, an internal gear-wheel secured to said driven shaft and meshing with one of said pinions, a gear-wheel on said driven shaft and meshing with said other pinion, an electrical brake having a stationary member in which said drive-shaft bears, a coöperating member loosely mounted on said drive-shaft and connected to one of said pinions, and controlling means which operates to energize one clutch, then the brake and then the other clutch, substantially as set forth.

4. An electrical induction clutch or brake comprising a member having oppositely-disposed radial pole-pieces separated by an intervening space, an electrical winding between said pole-pieces, and a second member which is movable relative to said first member and is provided with a ring arranged between said oppositely-disposed pole-pieces in a plane perpendicular to the axis of said second member, substantially as set forth.

5. An electrical induction clutch or brake comprising a spool member having radial pole-pieces at its opposite ends which are separated by an intervening space, an electrical winding on said spool between said pole-pieces, and a second member which is rotatable relative to said first member and consists of a spider provided with a copper ring which is arranged between said pole-pieces at opposite ends of said spool in a plane perpendicular to the axis of rotation of said second member, substantially as set forth.

Witness my hand this 29th day of May, 1903.

ABRAM P. STECKEL.

Witnesses:
   CHAS. W. PARKER,
   JNO. J. BONNER.